United States Patent
Lin et al.

(10) Patent No.: US 8,050,366 B2
(45) Date of Patent: Nov. 1, 2011

(54) DEVICE AND METHOD FOR COMPENSATING TIMING OFFSET

(75) Inventors: Chia-Tsung Lin, Taichung (TW);
Yung-Yih Jian, Taoyuan County (TW);
Jen-Yuan Hsu, Kinmen County (TW);
Pang-An Ting, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 924 days.

(21) Appl. No.: 12/068,507

(22) Filed: Feb. 7, 2008

(65) Prior Publication Data

US 2008/0232496 A1 Sep. 25, 2008

(30) Foreign Application Priority Data

Mar. 20, 2007 (TW) ................ 96109489 A

(51) Int. Cl.
*H04L 27/06* (2006.01)
*H04L 27/28* (2006.01)
*H04B 14/08* (2006.01)

(52) U.S. Cl. ...................... 375/344; 375/260

(58) Field of Classification Search ............ 375/260, 375/316, 340, 343, 354, 362, 365, 344; 370/480
See application file for complete search history.

(56) References Cited

U.S. PATENT DOCUMENTS

| | | | |
|---|---|---|---|
| 7,177,374 B2 | 2/2007 | Gaikwad et al. | |
| 7,251,283 B2 * | 7/2007 | Chen | 375/260 |
| 7,782,752 B2 * | 8/2010 | Gupta | 370/208 |
| 2004/0240593 A1 | 12/2004 | Su | |
| 2005/0100106 A1 * | 5/2005 | Chen | 375/260 |
| 2006/0039515 A1 | 2/2006 | Lee et al. | |
| 2006/0176802 A1 * | 8/2006 | Ko et al. | 370/208 |
| 2007/0217525 A1 * | 9/2007 | Vrcelj et al. | 375/260 |

FOREIGN PATENT DOCUMENTS

| | | |
|---|---|---|
| CN | 1845542 A | 10/2006 |
| EP | 1 710 967 A2 | 10/2006 |
| TW | 484287 B | 4/2002 |
| TW | 200420053 | 10/2004 |

OTHER PUBLICATIONS

Egashira et al., "Improvement of CCI Compensation Accuracy Using Feedback Phase Tracking in MIMO-OFDM Systems," Department of Computer Science, Chiba Institute of Technology, Chiba, Japan, IEEE Communications Society Globecom, 2004, pp. 923-927.
Chinese Office Action issued Jun. 7, 2011, corresponding to Chinese Patent Application No. 200710096179.5.

* cited by examiner

*Primary Examiner* — Betsy Deppe
(74) *Attorney, Agent, or Firm* — Birch, Stewart, Kolasch & Birch, LLP

(57) ABSTRACT

A method and OFDM receiver for estimating timing offset are provided. The method includes receiving OFDM data to calculate frequency offset between a transmitter carrier frequency and a receiver carrier frequency, determining first timing offset based on the frequency offset, compensating the OFDM data with the first timing offset, estimating a residual common phase based on the compensated OFDM data, determining second timing offset based on the residual common phase, and compensating the OFDM data with the second timing offset, if the frame symbol index exceeds the predetermined data length.

12 Claims, 8 Drawing Sheets

DEVICE AND METHOD FOR COMPENSATING TIMING OFFSET

BACKGROUND OF THE INVENTION

1. Field of the Invention

The invention relates to a device and a method for timing offset compensation.

2. Description of the Related Art

In a communication system, a sampling frequency error can occur between the transmitter and the receiver. This error causes a growing timing offset or sampling offset as the time increases. FIGS. 1a through 1d illustrate a timing offset due to asynchronous sampling periods between a transmitter and a receiver. In FIG. 1a, the upper half and the lower half represent sampling periods $T_{tx}$ and $T_{rx}$ at the transmitter and the receiver respectively. When these two sampling periods differ from each other, a growing timing offset occurs as the sampling size increases. When the timing offset exceeds the sampling period $T_{rx}$, the receiver misses transmission data signal. Thus, the time offset leads to a data loss. FIGS. 1b through 1d show the constellation diagrams for the data frames with 1, 10, and 40 OFDM symbol duration respectively. The results show that, the longer the frame symbol duration, the larger the noise induced.

There is thus a need for a timing offset estimator to compensate the timing offset effect between a transmitter and a receiver.

BRIEF SUMMARY OF THE INVENTION

A detailed description is given in the following embodiments with reference to the accompanying drawings.

A method of estimating timing offset in an OFDM (Orthogonal Frequency Division Multiplex) receiver is disclosed, comprising a time domain first timing offset estimation method and a frequency domain residual timing offset tracking method.

An OFDM receiver is also disclosed, comprising a frequency offset estimator, a first timing offset estimator, a frequency offset estimator, a first timing offset compensator, a common phase estimator, a second timing offset estimator, and a second timing offset compensator. The frequency offset estimator receives OFDM data and calculates the carrier frequency offset between a transmitter and a receiver. The first timing offset estimator, coupled to the frequency offset estimator, determines a first timing offset based on the estimated frequency offset. The timing offset compensator, coupled to the first timing offset estimator, compensates the OFDM data with the first timing offset. The common phase estimator, coupled to the first timing offset compensator, estimates a residual common phase based on the compensated OFDM data. The second timing offset estimator, coupled to the common phase estimator, determines second timing offset based on the residual common phase. The second timing offset compensator, coupled to the second timing offset estimator, compensates the OFDM data with the second timing offset if the amount of OFDM data exceeds a predetermined frame length.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is the best-contemplated mode of carrying out the invention. This description is made for the purpose of illustrating the general principles of the invention and should not be taken in a limiting sense. The scope of the invention is best determined by reference to the appended claims.

Figure 1A:
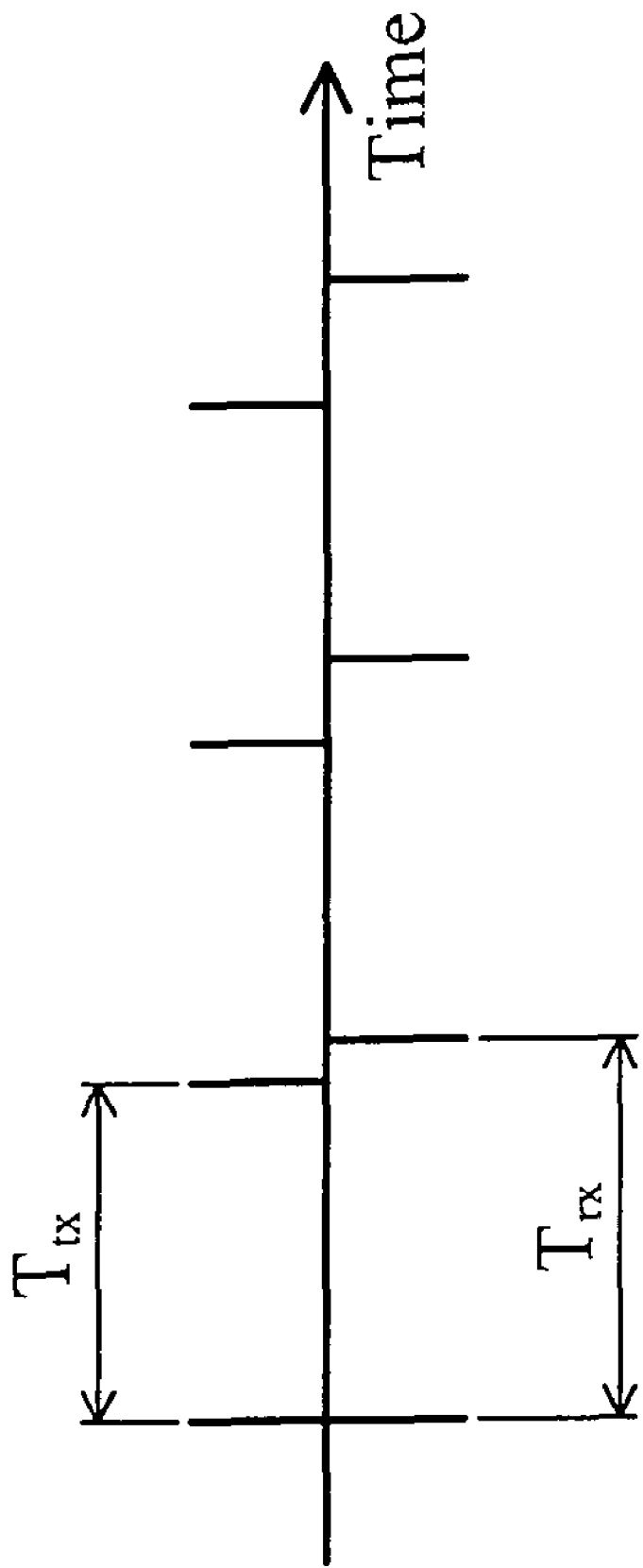
FIGS. 1a through 1d illustrate a timing offset due to asynchronous sampling periods between a transmitter and a receiver.
Figures 1B, 1C, 1D:
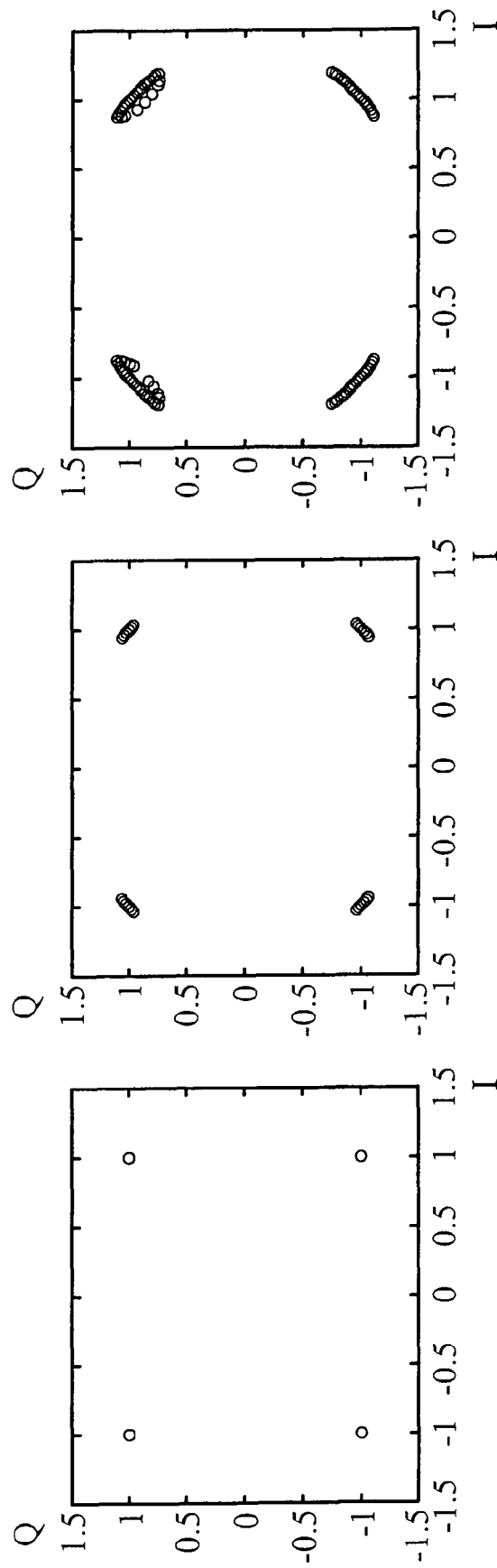
Figure 2:
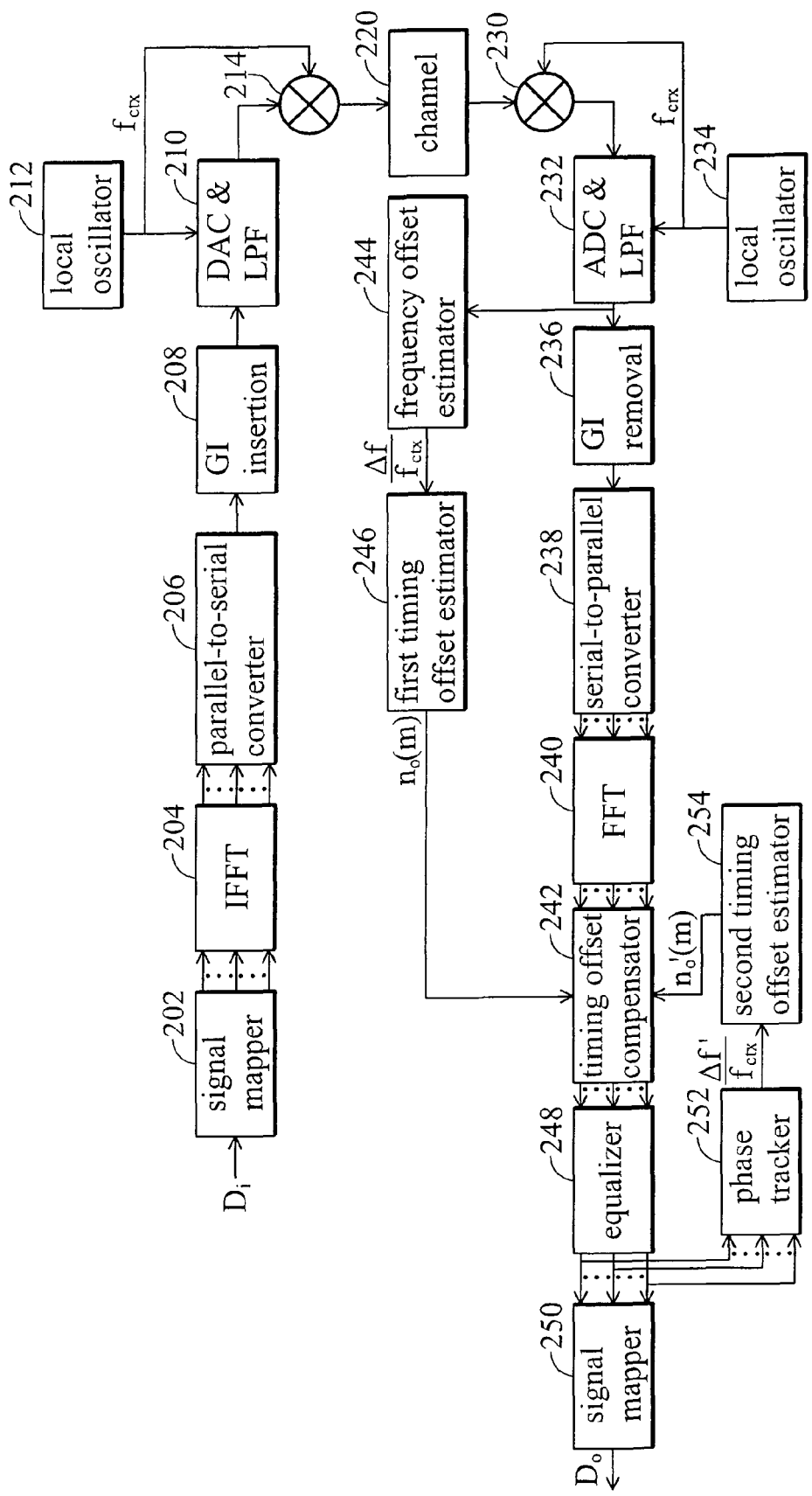
FIG. 2 is a block diagram of an exemplary OFDM system according to the invention.

FIG. 2 is a block diagram of an exemplary OFDM system according to the invention, comprising signal mapper 202, Inverse Fast Fourier Transform (IFFT) converter 204, parallel-to-serial converter 206, guard interval insertion unit 208, digital-to-analog converter and low pass filter (DAC & LPF) 210, local oscillator 212, mixer 214, channel 220, mixer 230, analog-to-digital converter and low pass filter (ADC & LPF) 232, local oscillator 234, guard interval removal unit 236, serial-to-parallel converter 238, Fast Fourier Transform (FFT) converter 240, timing offset compensator 242, frequency offset estimator 244, first timing offset estimator 246, equalizer 248, signal demapper 250, phase tracker 252, and second timing offset estimator 254.

Data $D_i$ passes through signal mapper 202, IFFT converter 204, parallel-to-serial converter 206, and guard interval insertion unit 208, then to DAC & LPF 210. Local oscillator 212 generates a signal with sampling period $T_{tx}$ to DAC & LPF 210, converting digital data into analog form. The mixer 214 performs frequency mixing on the analog data with the carrier frequency $f_{ctx}$. After the channel 220, the mixer 230 down converts the received signal with the carrier frequency $f_{crx}$. ADC & LPF 232 samples the down converted signal with sampling period $T_{rx}$. Then, this signal is processed by the guard interval removal unit 236, serial-to-parallel converter 238, FFT converter 240, timing offset compensator 242, equalizer 248, and symbol demapper 250 and provides output data $D_0$.

In an OFDM system, the timing offset in one OFDM symbol may be approximated as a fixed value, and a time domain signal x[n] may be obtained through Fast Fourier Transform (FFT):

$$x[n+n_o] \overset{FFT}{\longleftrightarrow} e^{j2\pi k \cdot n_o/N_{FFT}} X[k] \qquad (1)$$

Where x[n+$n_0$] is the time domain signal, X[k] is a frequency domain signal corresponding to x[n], $n_0$ is the offset of sampling delay, and $N_{FFT}$ is FFT size.

Figure 3:
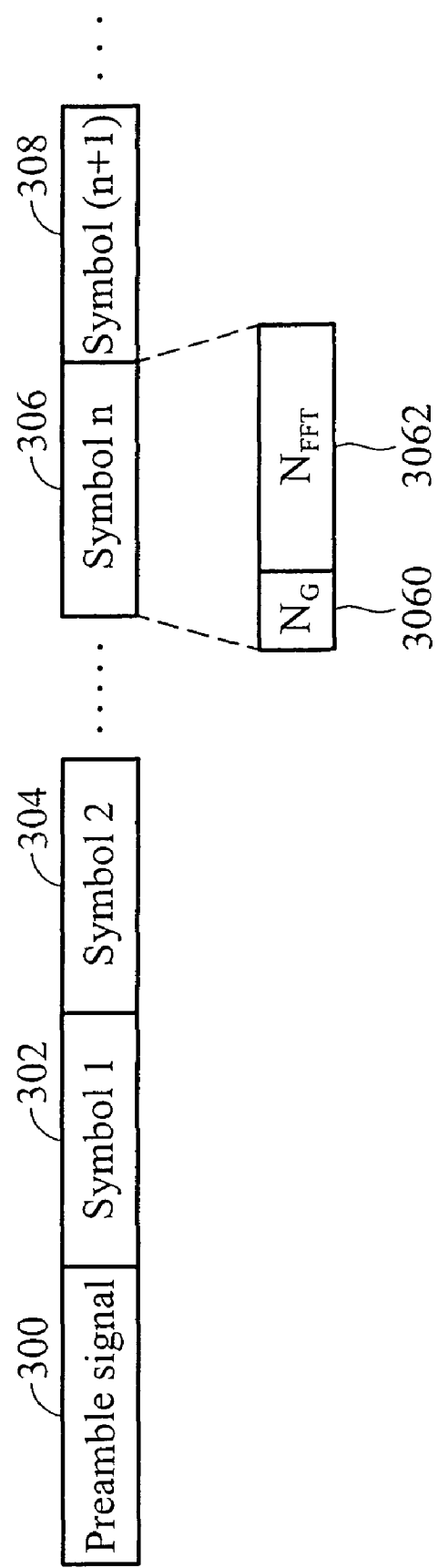
FIG. 3 shows a frame structure of an OFDM data in time domain.

FIG. 3 shows an OFDM frame structure in time domain, comprising preamble signal 300, and symbols 302 through 308. Preamble signal 300 is utilized for data synchronization, including automatic gain control (AGC), timing offset estimation, frequency offset estimation, and channel estimation.

The first timing offset compensation method according to the invention assumes that the time offset and the frequency offset are related proportionally. Since DAC 210 and mixer 214 share a common local oscillator 212 at the transmitter side, and ADC 232 and mixer 230 share a common local oscillator 234 at the receiver side, so that the relative timing offset and relative frequency offset both share an identical offset rate.

According to the assumption:

$$\frac{T_{rx} - T_{tx}}{T_{tx}} = \frac{1/f_{crx} - 1/f_{ctx}}{1/f_{ctx}} = \frac{f_{ctx} - f_{crx}}{f_{crx}} \quad (2)$$

Where $T_{tx}$ represents a sampling period at the transmitter, $T_{rx}$ represents a sampling period at the receiver, $f_{ctx}$ represents a carrier frequency at the transmitter, and $f_{crx}$ represents a carrier frequency at the receiver.

Figure 4:
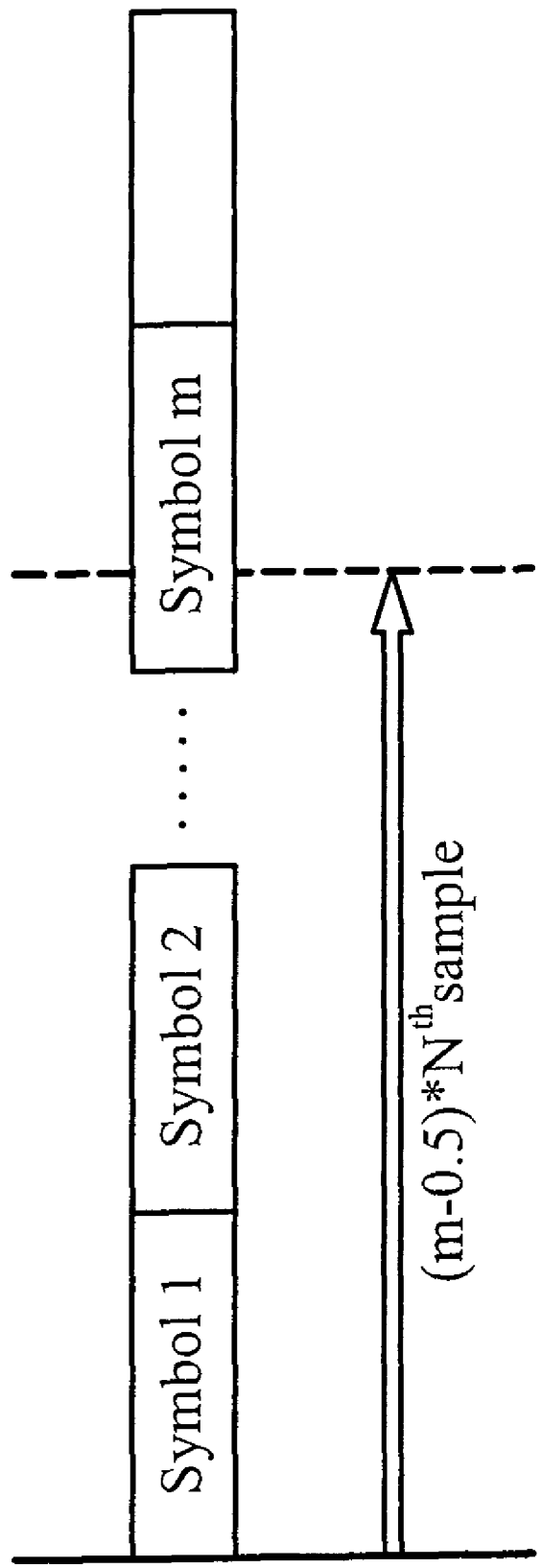
FIG. 4 illustrates a timing offset value.

Further, as shown in FIG. 4, according to the assumption, timing offset $n_0(m)$ at the m OFDM symbol is represented as:

$$n_o(m) \approx \frac{T_{rx} - T_{tx}}{T_{tx}} \cdot (m - 0.5)N \approx \frac{f_{ctx} - f_{crx}}{f_{crx}} \cdot (m - 0.5)N \quad (3)$$

Where $n_0(m)$ represents the timing offset of the $m_{th}$ OFDM symbol, m is a symbol index in an OFDM data frame, N is a symbol length of an OFDM symbol, $T_{tx}$ and $T_{rx}$ represent the sampling periods at the transmitter and receiver respectively, and $f_{ctx}$ and $f_{crx}$ represent the carrier frequencies at the transmitter and receiver respectively.

In the first timing offset estimation stage, utilizing a conventional method for estimating frequency offset, $(f_{ctx} - f_{crx})$ is obtained by using the preamble signal in the OFDM data:

$$f_{ctx} - f_{crx} = \frac{-1}{2\pi D T_s} \cdot \left( \sum_{n=0}^{L-1} r_n \cdot r_{n+D}^* \right) \quad (4)$$

Where $(f_{ctx} - f_{crx})$ is the frequency offset, D is the repetitive period length of the preamble signal, $r_n$ is the preamble signal in time domain and L is the number of average points.

Formula (4) provides a common method for computing a fractional frequency offset. If the signal has an integral frequency offset, the integral frequency offset must also be taken into account.

Further, if $(f_{ctx} - f_{crx})$ is substituted into Formula (3), the timing offset $n_0(m)$ corresponding to each OFDM symbol can be calculated. Since the frequency offset estimation is converted directly to timing offset estimation, the complexity of first timing offset estimation is reduced.

The timing offset compensator can remove the first timing offset effect by using phase rotation in frequency domain, as shown in Formula (1).

When the data frame is too long, the compensation provided in the first timing offset becomes insufficient. This is because of that there is still an estimation error exists, i.e., the residual frequency offset. Referring to Formula (2), the residual frequency offset can produce an estimation error in the first timing offset. The estimation errors in the frequency offset and first timing offset may be related by:

$$\frac{\Delta T'}{T_{tx}} = \frac{\Delta f'}{f_{crx}} \quad (5)$$

Where $\Delta f'$ represents the residual frequency offset, and $\Delta T'$ represents the estimation error of the first timing offset, referred to as residual timing offset. In the second timing offset estimation, the residual second timing offset $\Delta T'$ is compensated.

Residual frequency offset $\Delta f'$ produces a corresponding residual common phase term, which accumulates as time increases, and can be represented by:

$$\Phi(n) = 2\pi \Delta f' n T_s \quad (6)$$

Where $\Phi(n)$ represents the residual common phase of the $n_{th}$ sample, $\Delta f'$ represents the residual frequency offset, and $T_s$ represents the sampling period.

Figure 5:
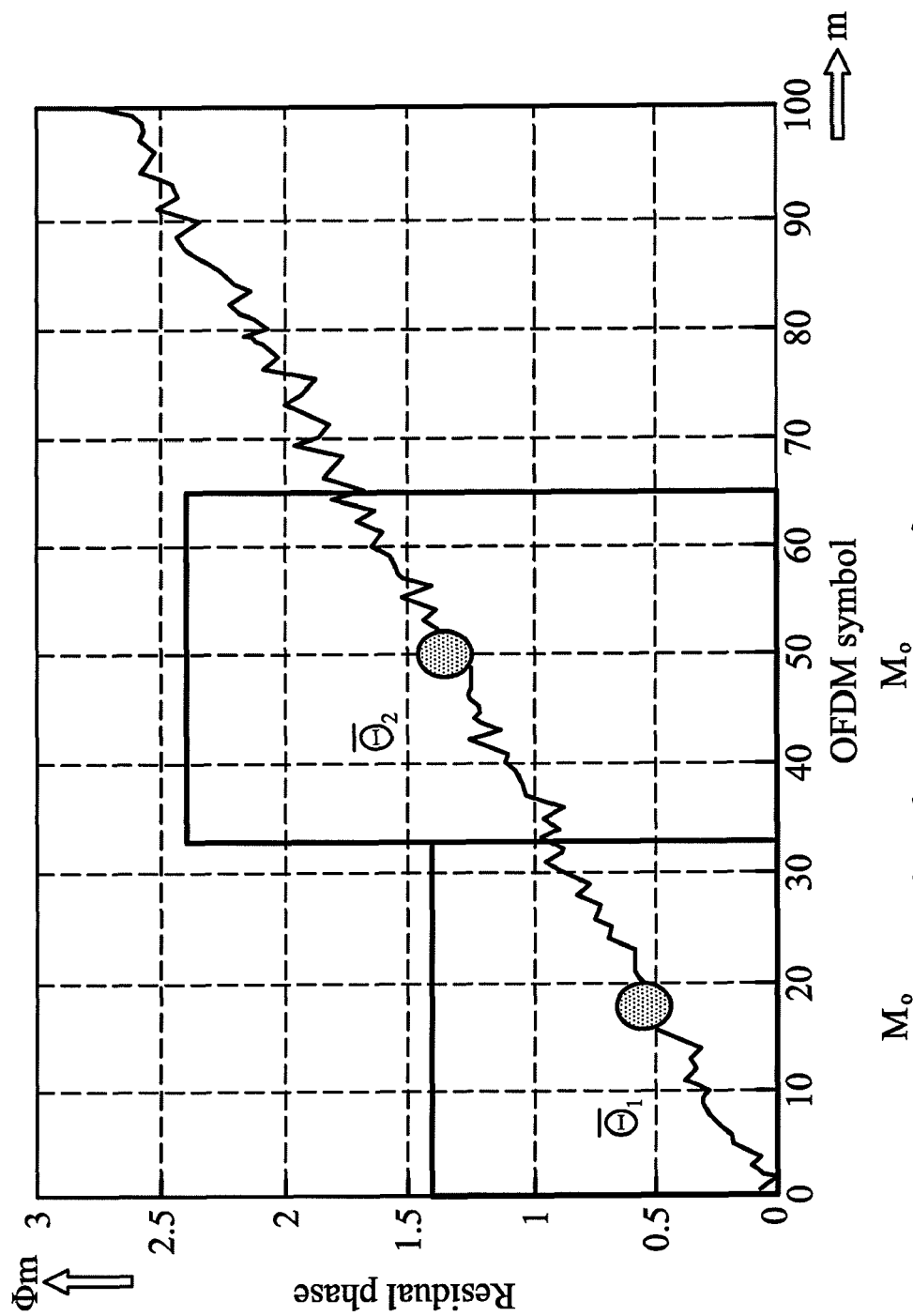
FIG. 5 shows a relationship of estimated residual common phase $(\Phi)_{est}$ and OFDM symbol index m.

Since the residual frequency offset $\Delta f'$ is not large, the residual common phase is approximated as a constant common phase in one OFDM symbol, represented by:

$$\Phi_m \approx 2\pi \Delta f'(m - 0.5) N T_s \quad (7)$$

where $\Phi_m$ is the residual common phase of the $m_{th}$ OFDM symbol. Residual common phase $\Phi_m$ may be estimated by:

$$(\Phi_m)_{est} = \Box \left[ \sum_{k=1}^{N_p} \tilde{R}_{m,k} \cdot (H_k P_{m,k})^* \right] \quad (8)$$

where $(\Phi_m)_{est}$ represents the estimation of the residual common phase in $m_{th}$ OFDM symbol, k represents pilot subcarrier index, $H_k$ represents the $k_{th}$ carrier frequency response, $P_{m,k}$ represents the $k_{th}$ pilot subcarrier in the $m_{th}$ OFDM symbol, $N_p$ is the count of pilot subcarriers in the OFDM symbol, and $\tilde{R}_{m,k} \approx H_k P_{m,k} e^{j\Phi_m}$ is the received $k_{th}$ pilot subcarrier in the $m_{th}$ OFDM symbol. Since the frequency offset is mostly compensated in the first stage, the common phase in $\tilde{R}_{m,k}$ results from the residual frequency offset. FIG. 5 shows a relationship of residual common phase and OFDM symbol index m according to the invention. Wherein, the horizontal axis represents OFDM symbol index m and the vertical axis represents residual common phase. The residual common phase and OFDM symbol index m have a linear relationship. Since residual common phase is estimated in the presence of phase noise, a fluctuation of estimated common phase $(\Phi_m)_{est}$ is shown in the linear relationship.

Using the linear property on FIG. 5 and formula (7), the following result is obtained:

$$\frac{1}{M_o} \sum_{m=1}^{M_o} \Phi_m = \overline{\Theta}_1 \approx 2\pi \Delta f' \cdot \left( \left( \frac{M_o + 1}{2} \right) - 0.5 \right) N T_s \quad (9)$$

$$\frac{1}{M_o} \sum_{m=M_o+1}^{2M_o} \Phi_m = \overline{\Theta}_2 \approx 2\pi \Delta f' \cdot \left( \left( \frac{3M_o + 1}{2} \right) - 0.5 \right) N T_s \quad (10)$$

Where $M_o$ is the average length. Subtracting Formula (9) from (10), and dividing the result by $2\pi f_c M_o NT_s$, we have:

$$\frac{\frac{1}{M_o}\sum_{m=M_o+1}^{2M_o}\phi_m - \frac{1}{M_o}\sum_{m=1}^{M_o}\phi_m}{2\pi f_C M_o NT_s} \approx \frac{\overline{\Theta}_2 - \overline{\Theta}_1}{2\pi f_C M_o NT_s} \approx$$
$$\frac{2\pi\Delta f'\left(\left(\frac{3M_o+1}{2}\right) - 0.5\right)NT_s - 2\pi\Delta f'\left(\left(\frac{M_o+1}{2}\right) - 0.5\right)NT_s}{2\pi f c M_o NT_s} \approx$$
$$\frac{2\pi\Delta f c M_o NT_s}{2\pi f c M_o NT_s} \approx \frac{\Delta f'}{fc} \qquad (11)$$

For the algorithm in the second timing offset estimation, Formula (11) can be utilized to calculate $$\frac{\Delta f'}{f_c}, \text{ and } \frac{\Delta T'}{T_{tx}}$$

can be obtained according to Formula (5). Thus the estimation of the second timing offset $n'_o(m)$ at $m_{th}$ OFDM symbol is:

$$n'_o(m) \approx \frac{\Delta T'}{T_{tx}} \cdot (m - 0.5)N \qquad (12)$$

Finally, the second timing offset $n'_o(m)$ is compensated in frequency domain by using Formula (1).

Figure 6:
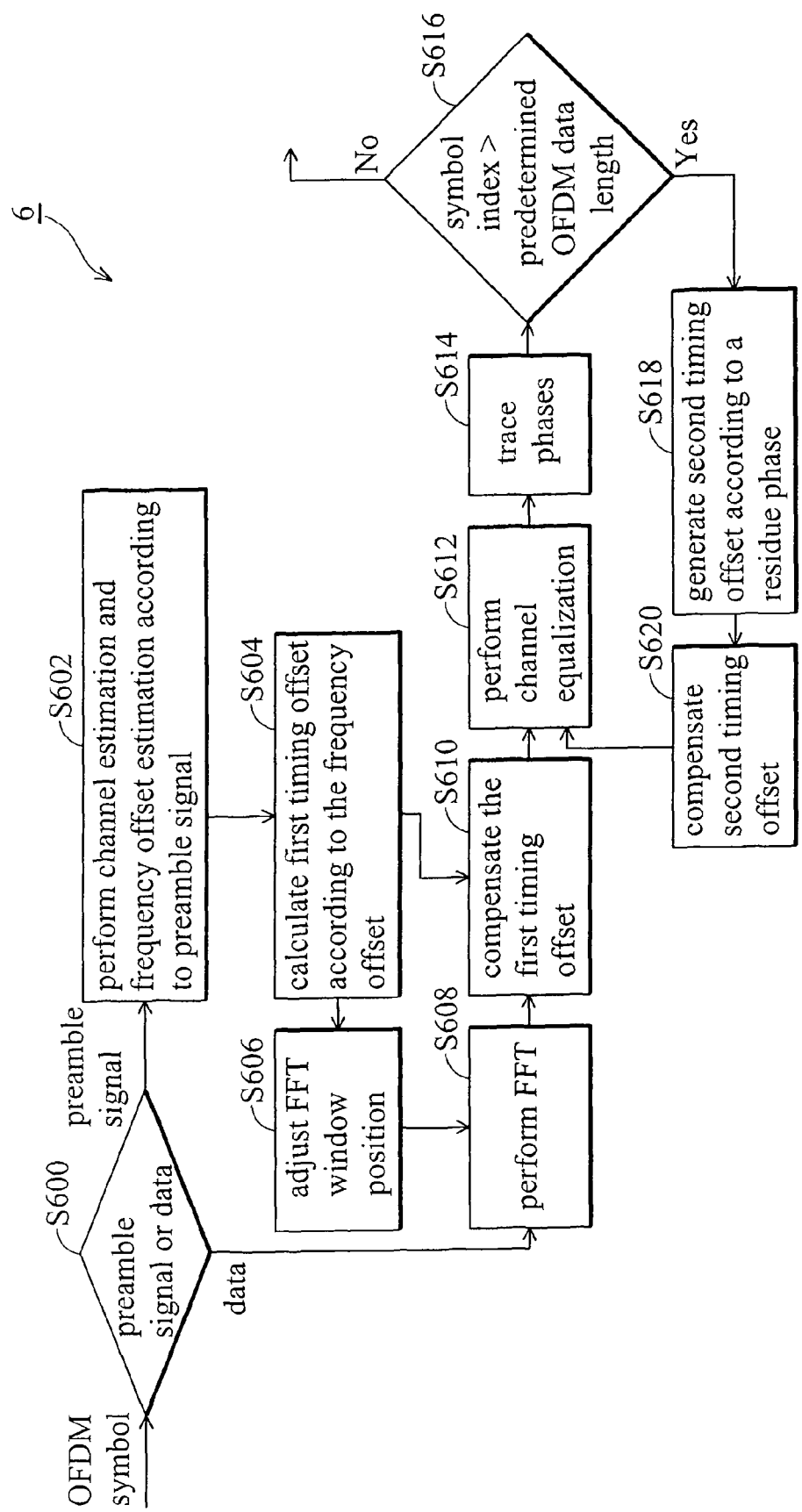
FIG. 6 is a flowchart of an exemplary first timing offset and second time offset compensation method according to the invention.

FIG. 6 is a flowchart of an exemplary timing offset compensation method according to the invention, integrating the first timing offset and second timing offset compensation methods.

In step S600, the process is separated into preamble part and data symbol part. For the preamble signal, frequency offset and timing offset are estimated according to steps S602 and S604. For the data symbols, FFT is performed, converting data symbol from time domain to frequency domain.

In step S602, channel estimation and frequency offset estimation are executed according to the input preamble pattern. After that in step S604, by utilizing the Formula (3), the first timing offset is calculated.

In step S606, according to the integral of the timing offset the integer part of the starting point for the FFT window is controlled to align with transmitter side symbol timing.

Next in step S608, FFT of the OFDM data frame is performed, according to the FFT window starting point determined in step S606.

Because the integer part of first timing offset is compensated in step 606 and 608. Only the fractional part of first timing offset is remained. In Step S610, the fraction part of first timing offset is compensated with phase rotation method for each subcarrier, as shown in Formula (1).

In step S612, the equalizer equalizes each subcarrier. After that, in step S614 phase tracker 252 traces residual phase $\Phi_m$ of the OFDM symbols. Then step S616 checks whether the symbol index exceeds predetermined OFDM data length $N_0$. If not, second timing offset estimation and compensation method are not required since the residual second timing offset is insignificant. Conversely, if the data symbol index exceeds predetermined data length $N_O$, the second timing offset estimation is performed in step S618.

In step 618, the second timing offset is calculated for each $M_o$ OFDM symbol block according to residual common phase $\Phi_m$. Formula (11) is used by phase tracker 252 to estimate relative residual frequency offset $$\frac{\Delta f'}{f_c},$$

and Formula (5) is used to estimate relative second timing offset $$\frac{\Delta T'}{T_{tx}}.$$

And the second timing offset $n'_o(m)$ is calculated from Formula (12) and is sent to timing offset compensator 242.

Next in step S620, second timing offset compensator 242 further uses Formula (1) to compensate residual second timing offset $n'_o(m)$ and outputs the compensated result through 248.

Figure 7:
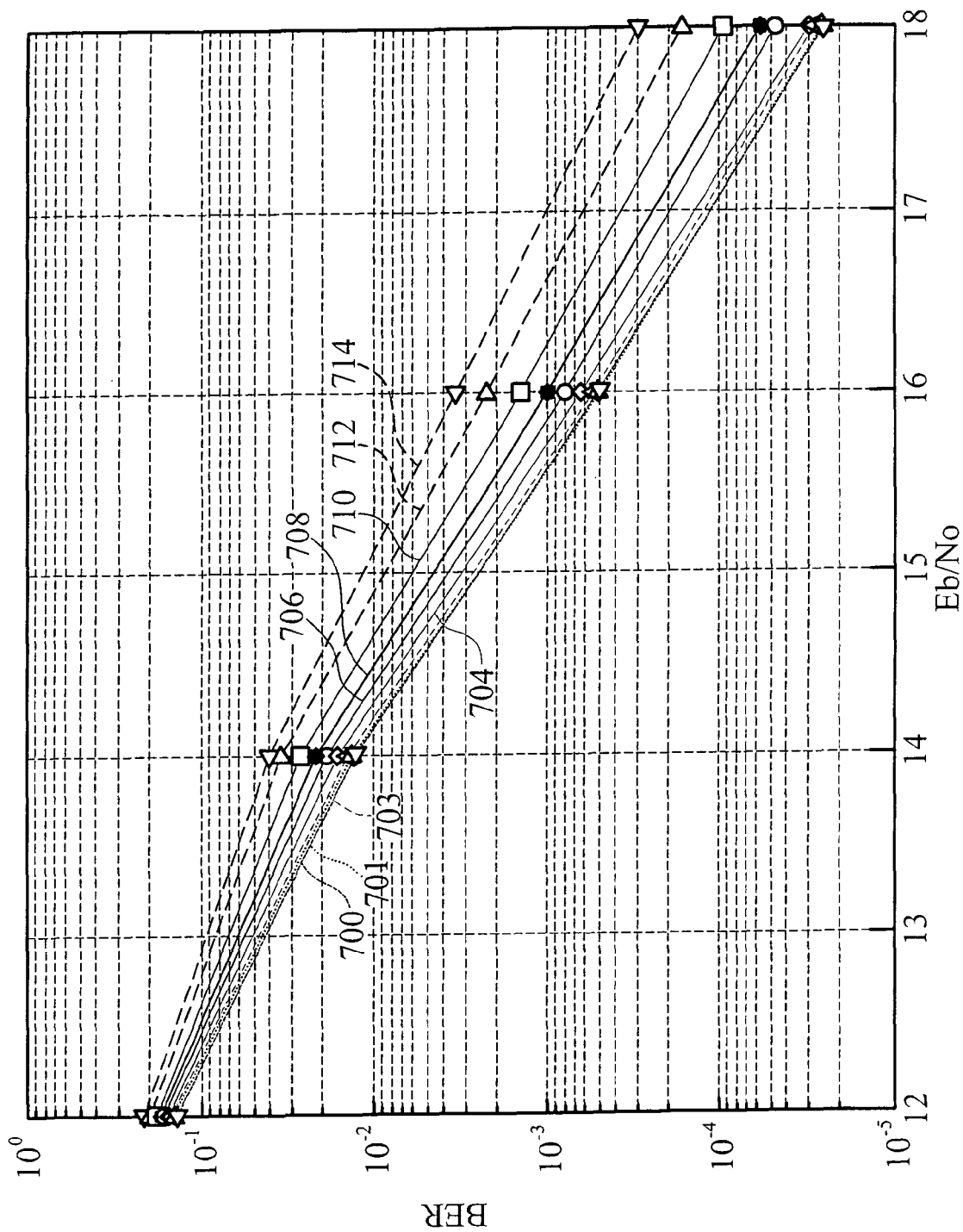
FIG. 7 shows simulated results for several timing offset $n_0$.

Second timing offset compensation process is initialized only when the symbol index exceeds predetermined data length $N_o$ for the reason of reducing computation complexity. The predetermined data length $N_o$ exceeds twice OFDM symbol block length $M_0$ as shown in FIG. 5, and can be adaptive subject to requirements. An exemplary method of determining value $N_o$ is to choose the value that timing offset $n_o$ varies and system efficiency begins to degrade due to serious bit error rate. FIG. 7 shows the simulation results for several timing offset $n_o$ using IEEE 802.16-2004 OFDM mode, under AWGN condition with modulation of 64-QAM and $$RS\text{-}CC\frac{3}{4}$$

channel coding. For example, the system generates significant error rate when $n_o>0.04$ (704), thus 0.04 is $n_{o,failure}$.

Next, $N_o$ is calculated according to $n_{o,failure}$ and Formula (21):

$$n_0(N_o)\bigg|_{performance\ failure} \approx \frac{\Delta T'}{T_{tx}} \cdot (N_o - 0.5) \cdot N \text{ where } \frac{\Delta T'}{T_{tx}} \qquad (21)$$

can be deduced from $$\frac{\Delta f'}{f_c}$$

and evaluated by simulation. The predetermined data length $N_o$ indicates the threshold to check whether the residual timing offset is too significant for the system to ignore. In sum, the first timing offset compensation is sufficient when the frequency offset estimation using a preamble signal is precise enough, or when the length of data frame is not too long. Secondly, when the frequency offset estimation using a preamble signal is not precise enough, or the length of data frame is long, second timing offset compensation has to be activated to increase estimation precision.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of estimating timing offset in an OFDM (Orthogonal Frequency Division Multiplex) receiver, comprising:

receiving OFDM data to calculate a frequency offset between a transmitter carrier frequency and a receiver carrier frequency;

determining a first timing offset based on the frequency offset;

compensating the OFDM data with the first timing offset;

estimating a residual common phase based on the compensated OFDM data;

determining a second timing offset based on the residual common phase; and compensating the OFDM data with the second timing offset, if a length of the OFDM data exceeds a predetermined frame length.

2. The method of claim 1, wherein the residual common phase is:

$$(\Phi_m)_{est} = R\left[\sum_{k=1}^{N_p} R^\%_{m,k} \cdot (H_k P_{m,k})^*\right]$$

where m is the number of OFDM symbols in an OFDM frame;

$(\Phi_m)_{est}$ is estimation of the residual common phase in $m_{th}$ OFDM symbol;

OFDM symbol;

$H_k$ is the $k_{th}$ carrier frequency response;

$P_{m,k}$ is the $k_{th}$ pilot subcarrier in the $m_{th}$ OFDM symbol;

$R^\%_{m,k} \approx H_k P_{m,k} e^{j\Phi_m}$, the received $k_m$ pilot subcarrier in the $m_{th}$ OFDM symbol;

$N_p$ is the count of pilot subcarriers in the OFDM symbol.

3. The method of claim 1, wherein the determining the second timing offset step comprises:

computing an average residual common phase for every predetermined number of the OFDM symbols;

estimating a residual frequency offset based on a difference between two consecutive average residual common phases; and determining the second timing offset by:

$$n'_o(m) = \frac{\Delta f'}{f_{ctx}} \cdot (m - 0.5)N,$$

where $n_o'(m)$ is the second timing offset at $m_{th}$ OFDM symbol;

m is the symbol index in an OFDM data frame;

N is the symbol length of an OFDM symbol;

$\Delta f'$ is the residual frequency offset; and $f_{ctx}$ is the carrier frequencies at the transmitter.

4. The method of claim 1, wherein the first timing offset is determined based on:

$$n_o(m) = \frac{f_{crx} - f_{ctx}}{f_{ctx}} \cdot (m - 0.5)N$$

where $n_o(m)$ is the first timing offset;

m is the symbol index in an OFDM data frame;

N is the symbol length of an OFDM symbol;

$f_{crx}$ is the carrier frequencies at the receiver; and $f_{ctx}$ is the carrier frequencies at the transmitter.

5. The method of claim 1, wherein the OFDM data constitutes a preamble, and the frequency offset is calculated by:

$$f_{ctx} = f_{crx} = \frac{-1}{2\pi D T_s} \cdot \left(\sum_{n=0}^{L-1} r_n \cdot r^*_{n+D}\right)$$

where $(f_{ctx}-f_{crx})$ is the frequency offset;

$T_s$ is the preamble signal in time domain;

D is the repetitive period length of the preamble signal;

L is the number of average points; and $r_n$ is the preamble signal in time domain.

6. The method of claim 1, wherein the first timing offset comprises an integer part and a fractional part, and the compensation of the OFDM data with the first timing offset comprises:

adjusting FFT window position according to the integer part;

converting the OFDM data in the FFT window position to frequency domain; and compensating the fractional part timing offset by using phase rotation in frequency domain.

7. An OFDM receiver, comprising:

a frequency offset estimator, receiving OFDM data to calculate frequency offset between a transmitter carrier frequency and a receiver carrier frequency;

a first timing offset estimator, coupled to the frequency offset estimator, determining first timing offset based on the calculated frequency offset;

a first timing offset compensator, coupled to the first timing offset estimator, compensating the OFDM data with the first timing offset;

a residual common phase estimator, coupled to the first timing offset compensator, estimating a residual common phase based on the compensated OFDM data; and a second timing offset estimator, coupled to the residual common phase estimator, determining a second timing offset based on the residual common phase;

wherein the first timing offset compensator is coupled to the second timing offset estimator and compensates the OFDM data with the second timing offset, if a length of the OFDM data exceeds a predetermined data length.

8. The OFDM receiver of claim 7, wherein the residual common phase is:

$$(\Phi_m)_{est} = R\left[\sum_{k=1}^{N_p} R^\%_{m,k} \cdot (H_k P_{m,k})^*\right]$$

where m is a number of OFDM symbols in an OFDM frame;

$(\Phi_m)_{est}$, is the estimation of the residual common phase in $m_{th}$ OFDM symbol ;

$H_k$ is the $k_{th}$, carrier frequency response;

$P_{m,k}$ is the $k_{th}$ pilot subcarrier in the $m_{th}$ OFDM symbol;
$R_{m,k}\%\approx H_k P_{m,k} e^{j\Phi_m}$ is the received $k_{th}$ pilot subcarrier in the $m_{th}$ OFDM symbol; and
$N_p$ is the count of pilot subcarriers in the OFDM symbol.

9. The OFDM receiver of claim 7, wherein the second timing offset estimator further:
computes an average residual common phase for every predetermined number of the OFDM symbols;
estimates a residual frequency offset based on difference between two consecutive average residual common phases; and
determines the second timing offset by:

$$n'_o(m) = \frac{\Delta f'}{f_{ctx}} \cdot (m - 0.5)N,$$

where $n_o'(m)$ is the second timing offset at $m_{th}$ OFDM symbol;
m is the symbol index in an OFDM data frame;
N is the symbol length of an OFDM symbol;
$\Delta f'$ is the residual frequency offset; and
$f_{ctx}$ is the carrier frequencies at the transmitter.

10. The OFDM receiver of claim 7, wherein the first timing offset estimator determines the first timing offset based on the following:

$$n_o(m) = \frac{f_{crx} - f_{ctx}}{f_{ctx}} \cdot (m - 0.5)N$$

where $n_o(m)$ is the first timing offset;
m is the symbol index in an OFDM data frame;
N is the symbol length of an OFDM symbol;
$f_{crx}$ is the carrier frequencies at the receiver; and
$f_{ctx}$ is the carrier frequencies at the transmitter.

11. The OFDM receiver of claim 7, wherein the OFDM data constitute a preamble, and the frequency offset is calculated by:

$$f_{ctx} = f_{crx} = \frac{-1}{2\pi D T_s} \cdot \left( \sum_{n=0}^{L-1} r_n \cdot r_{n+D}^* \right)$$

where $(f_{ctx} - f_{crx})$ is the frequency offset;
$T_s$ is the preamble signal in time domain;
D is the repetitive period length of the preamble signal;
L is the number of average points; and
$r_n$ is the preamble signal in time domain.

12. The OFDM receiver of claim 7, wherein the first timing offset comprises an integer part and a fractional part, and the OFDM receiver further comprises:
a frequency domain transformer, adjusting a FFT window position according to the integer part, and converting the OFDM data in the FFT window position to frequency domain; and
the first timing offset compensator coupled to the frequency domain transformer and compensating the converted OFDM data based on the fractional part.

* * * * *